(12) United States Patent
Lord

(10) Patent No.: US 12,200,115 B2
(45) Date of Patent: Jan. 14, 2025

(54) QKD NETWORK ARCHITECTURES

(71) Applicant: BRITISH TELECOMMUNICATIONS PUBLIC LIMITED COMPANY, London (GB)

(72) Inventor: Andrew Lord, London (GB)

(73) Assignee: British Telecommunications Public Limited Company (GB)

(*) Notice: Subject to any disclaimer, the term of this patent is extended or adjusted under 35 U.S.C. 154(b) by 347 days.

(21) Appl. No.: 17/593,684

(22) PCT Filed: Mar. 11, 2020

(86) PCT No.: PCT/EP2020/056551
§ 371 (c)(1),
(2) Date: Sep. 22, 2021

(87) PCT Pub. No.: WO2020/193147
PCT Pub. Date: Oct. 1, 2020

(65) Prior Publication Data
US 2022/0173895 A1 Jun. 2, 2022

(30) Foreign Application Priority Data
Mar. 22, 2019 (EP) ..................................... 19164657

(51) Int. Cl.
*H04L 9/08* (2006.01)
*H04B 10/70* (2013.01)

(52) U.S. Cl.
CPC ........... *H04L 9/0852* (2013.01); *H04B 10/70* (2013.01); *H04L 9/0825* (2013.01)

(58) Field of Classification Search
CPC ....... H04L 9/0852; H04L 9/0825; H04L 9/08; H04B 10/70
See application file for complete search history.

(56) References Cited

U.S. PATENT DOCUMENTS 5,850,441 A * 12/1998 Townsend ........... G02F 1/13471
398/40
7,826,749 B2 * 11/2010 Luo ..................... H04J 14/0246
380/278

(Continued)

FOREIGN PATENT DOCUMENTS

CN 104092538 A 10/2014
CN 109217938 A * 1/2019 ............. H04B 10/70

(Continued)

OTHER PUBLICATIONS

Combined Search and Examination Report under Section 17 and 18(3) for GB Application No. 1903952.8, mailed on Sep. 19, 2019, 5 pages.

(Continued)

*Primary Examiner* — Michael R Vaughan
*Assistant Examiner* — Ethan V Vo
(74) *Attorney, Agent, or Firm* — PRANGER LAW PC

(57) ABSTRACT

There is herein disclosed a system for performing Quantum Key Distribution, the system including a transmitter adapted to transmit a plurality of optical pulses, a first receiver, a second receiver, an optical switch with an input which is in optical communication with the transmitter, the switch being switchable between a first switching position in which the input is optically connected to the first receiver, and a second switching position in which the input is optically connected to the second receiver, the system further including a guide for guiding a portion of the plurality of optical pulses to the first receiver via an optical path that bypasses the optical switch.

17 Claims, 3 Drawing Sheets

(56) References Cited

U.S. PATENT DOCUMENTS

| | | | |
|---|---|---|---|
| 8,792,791 B2 | 7/2014 | Wiseman et al. | |
| 9,559,802 B1 | 1/2017 | Dashti et al. | |
| 2003/0095314 A1 | 5/2003 | Shimada et al. | |
| 2005/0249352 A1* | 11/2005 | Choi | H04L 9/0852 380/286 |
| 2007/0248229 A1* | 10/2007 | Kawamoto | H04L 9/0858 380/256 |
| 2010/0299526 A1* | 11/2010 | Wiseman | H04L 63/061 713/171 |
| 2011/0069972 A1 | 3/2011 | Wiseman et al. | |
| 2011/0085666 A1* | 4/2011 | Hicks | H04L 9/0852 380/278 |
| 2012/0328290 A1 | 12/2012 | Yuan et al. | |
| 2013/0051800 A1* | 2/2013 | Soto Rodriguez | H04L 9/0852 398/65 |
| 2014/0112478 A1* | 4/2014 | Arahira | H04L 9/0852 380/278 |
| 2016/0234018 A1* | 8/2016 | Frohlich | H04B 10/70 |
| 2019/0222415 A1* | 7/2019 | Kikawada | H04B 10/70 |
| 2020/0044835 A1* | 2/2020 | Legre | H04B 10/70 |
| 2020/0389299 A1* | 12/2020 | White | H04B 10/85 |

FOREIGN PATENT DOCUMENTS

| | | |
|---|---|---|
| CN | 107566041 B | 11/2022 |
| EP | 0717895 B1 | 11/1998 |
| EP | 3301851 A1 | 4/2018 |
| EP | 3340529 A1 | 6/2018 |
| GB | 2534917 A | 8/2016 |
| GB | 2560564 A | 9/2018 |
| KR | 101590105 B1 | 2/2016 |
| WO | WO-2009141586 A1 | 11/2009 |
| WO | WO-2018130052 A1 | 7/2018 |

OTHER PUBLICATIONS

Combined Search and Examination Report under Section 17 and 18(3) for GB Application No. 1903954.4, mailed on Sep. 20, 2019, 6 pages.

Extended European Search Report for Application No. 19164656.1, mailed on Sep. 5, 2019, 8 pages.

Extended European Search Report for Application No. 19164657.9, mailed on Sep. 23, 2019, 9 pages.

Honjo T., et al., "Quantum key Distribution Experiment through a PLC Matrix Switch," Optics Communications, 2006, vol. 263, XP028081418, ISSN: 0030-4018, DoI:10.1016/J.OPTION.2006-07-01, pp. 120-123.

International Search Report and Written Opinion for Application No. PCT/EP2020/056551, mailed on Jul. 2, 2020, 13 pages.

International Search Report and Written Opinion for Application No. PCT/EP2020/056548, mailed on May 27, 2020, 12 pages.

Maeda W., et al., "Technologies for Quantum Key Distribution Networks Integrated With Optical Communication Networks," IEEE Journal of Selected Topics in Quantum Electronics, Nov./Dec. 2009, vol. 15, No. 6, 11 pages.

Office Action for GB Application No. 1903952.8, mailed on Jul. 19, 2021, 4 pages.

Tang X., et al., "Demonstration of an Active Quantum Key Distribution Network," Proceedings of the SPIE—The International Society for Optical Engineering SPIE—Vertical-Cavity Surface-Emitting Lasers XIII, Aug. 31, 2006, vol. 6305, XP055615247, SPIE OPTO: Integrated Optoelectronic DEVICES24—Jan. 29, 2009an Jose, California, Untied States ISSN: 0277-786X, D01: 10.1117/12.679589, 6 pages.

International Preliminary Report on Patentability for Application No. PCT/EP2020/056548, mailed on Oct. 7, 2021, 8 pages.

International Preliminary Report on Patentability for Application No. PCT/EP2020/056551, mailed on Oct. 7, 2021, 9 pages.

Office Action received for Chinese Patent Application No. 202080019414.2, mailed on Oct. 31, 2023, 10 pages (English Translation).

"Office Action received for Chinese Patent Application No. 202080019394.9, mailed on Jan. 5, 2024", 18 pages (11 pages of English Translation and 7 pages of Official Copy).

"Office Action received for Chinese Patent Application No. 202080019414.2, mailed on Jan. 23, 2024", 6 pages (3 pages of English Translation and 3 pages of Official Copy).

* cited by examiner

QKD NETWORK ARCHITECTURES

PRIORITY CLAIM

The present application is a National Phase entry of PCT Application No. PCT/EP2020/056551, filed Mar. 11, 2020, which claims priority from EP Patent Application No. 19164657.9, filed Mar. 22, 2019, each of which is hereby fully incorporated herein by reference.

BACKGROUND

QKD (Quantum Key Distribution) is a known method of highly-secure communication which enables two parties to produce a shared secret key. In the broadest sense, QKD networks involve a transmitting unit (referred to as Alice) which generates a single photon pulse, encodes it with a randomly-chosen value of 0 or 1 and applies a modulation to it. In a known example system this is done by polarizing the pulse using a randomly-chosen polarization basis. The pulse is then transmitted to a receiving unit (referred to as Bob) which attempts to measure the encoded value. In the example system this is done by passing the pulse through a polarizer with a randomly-chosen polarization basis. The process is repeated for multiple pulses. Alice and Bob then exchange information regarding the pulses and, in doing so, arrive at a shared secret key.

QKD arrangements are expensive and one way of reducing costs is to have a single Alice which transmits pulses to multiple Bobs. Such arrangements have a branched optical path so that each Bob receives a proportion of the pulses. Optical splitters have been used to provide the branched optical path. A problem with splitting the signal is that some of the Bobs may not receive a sufficiently high pulse rate to meet their key generation demands. This is particularly true if, say, one Bob needs to produce a larger number of keys than the others. It may also be true if one Bob is located further from the splitter than the others (as the pulses directed to it will suffer more attenuation), or if there are a large number of Bobs.

It would be desirable to overcome or mitigate some and/or all of the above-mentioned and/or other disadvantages of these approaches.

SUMMARY

According to a first aspect of the disclosure there is provided a system for performing Quantum Key Distribution, the system comprising a transmitter adapted to transmit a plurality of optical pulses; a first receiver; a second receiver; an optical switch, having an input which is in optical communication with the transmitter, the optical switch being switchable between a first switching position in which the input is optically connected to the first receiver, and a second switching position in which the input is optically connected to the second receiver; and a guide for guiding a portion of the plurality of optical pulses to the first receiver via an optical path that bypasses the optical switch.

Embodiments of the disclosure enable a system to be constructed in which a high-power pulse stream can be provided, via the switch, to a receiver when its key generation need is high, while also continuously providing the other receivers with a sufficiently high-power pulse stream to avoid disconnection and the resulting time-consuming re-initiation process.

According to a second aspect of the disclosure there is provided a method of performing Quantum Key Distribution between a transmitter and first and second receivers, the method comprising at the transmitter, transmitting a plurality of optical pulses, guiding the plurality of optical pulses to an input of an optical switch, the optical switch being switchable between a first switching position in which the input is optically connected to the first receiver, and a second switching position in which the input is optically connected to the second receiver, and guiding a portion of the plurality of pulses from the transmitter to the first receiver via an optical communication path that bypasses the optical switch.

A modulation may be applied to the pulses before being transmitted. The step of applying a modulation to the pulses may comprise polarizing the pulses using a randomly chosen polarization basis. Alternatively, the step of applying a modulation to the pulses comprises modulating the phase or the position of the pulse. After being encoded and modulated the pulses may be transmitted in accordance with QKD principles.

The value encoded onto the pulse or the modulation basis applied to the pulse or the time of transmission of the pulse may be recorded. The modulation basis may be the polarization basis. Furthermore, the transmitter may be connected for communication with each of the receivers by a respective non-quantum channel. The non-quantum channel may be a metallic wire, or an optical fiber or free space. The transmitter may send some or all of the recorded information to one or more of the receivers using the respective non-quantum channel.

The value that has been encoded onto the pulses (i.e. a one or a zero) may be measured at each of the receivers using randomly chosen modulation basis which may be a randomly chosen polarization basis. For each received pulse, the measured value and/or the polarization basis used for the measurement and/or the arrival time of the pulse may be recorded. Each of the receivers may send the measured value and/or the arrival time of the pulse to the transmitter using its respective non-quantum channel.

The optical pulses may be single-photon pulses. Single-photon pulses may be generated by a single-photon generator.

In the first switching position the input may be optically connected to the first receiver only. In the second switching position the input may be optically connected to the second receiver only. The system may comprise one or more further receivers. The input of the optical switch may be in optical communication with the transmitter via a conduit or through the atmosphere. The conduit may be an optical fiber. The switch may have a first output and a second output. When the switch is in the first switching position, the input may be optically connected to the first output. The first output may be optically connected to the first receiver. When the switch is in the second switching position, the input may be in optical communication with the second output. The second output may be optically connected to the second receiver.

The switch may have one or more further switching positions and may have one or more corresponding further outputs. The switch may be adapted such that in each of the one or more further switching positions, the switch input is optically connected to the corresponding further output. Each of the one or more corresponding further outputs may be optically connected to a corresponding one of the one or more further receivers.

The system may comprise a controller adapted to control the optical switch. The controller may be adapted to control the switching position of the switch. The controller may be adapted to send a control signal to the switch to control the switching position of the switch. The controller may instruct the switch to move to the switching position corresponding to the receiver having the highest optical pulse rate requirements. The first or second or further receivers may be adapted to send to the controller an indication of the optical pulse rate required by that receiver or receivers.

The guide may comprise an optical splitter. The system may be arranged such that the splitter receives an input from the transmitter. In use, the splitter may receive the transmitted plurality of optical pulses through the input and split the plurality of optical pulses such that the portion of the plurality optical pulses is guided onto a different path to the remainder of the plurality of optical pulses. The portion of the plurality optical pulses that are guided onto a different path may constitute less than 50% of the pulse stream, or in embodiments constitute less than 25% of the pulse stream, and in other embodiments constitute 10% of the pulse stream. The splitter may have a first output for outputting the portion of the plurality of optical pulses and may have a second output for outputting the remainder of the plurality of optical pulses. The second output may be optically connected to the input of the switch.

Although in preferred embodiments the guide comprises a splitter, a person having ordinary skill in the art would understand that it would be possible to provide a guide which did not comprise a splitter but which provides substantially the same functionality. A possible example of this would be an arrangement which provided a plurality of pulses to a first output for a short time period, then provided a plurality of pulses to a second output for a short time period, and repeated this cycle over a long period. Over time such an arrangement would direct a proportion of the pulse stream to each of the outputs.

The guide may guide optical pulses to the second receiver. A second splitter may be provided, having an input which is optically connected to the first output of the first splitter. The second splitter may have a first output which is optically connected to the first receiver. The second splitter may further comprise a second output which is optically connected to and second receiver. In use, the portion of the plurality of optical pulses output from the first output of the first splitter may be input at the input of the second splitter and may be split by the second splitter into a first component which is output to the first receiver and a second component which is output to the second receiver.

In embodiments in which there are one or more further receivers, the guide may guide optical pulses to the one or more further receivers. In embodiments the second splitter may have one or more further outputs, each of which is optically connected to one of the one or more further receivers. In embodiments, the portion of the plurality of optical pulses input to the second splitter is split between the first, second and one or more further outputs of the second splitter. The components into which the portion of the plurality of optical pulses is split by the second splitter may be equal in power.

The pulse stream output by the switch may be combined with the pulse stream output by the second splitter before arriving at a respective receiver. The system may further comprise a pulse stream combiner. The pulse stream combiner may be adapted to combine two input pulse streams using a combining ratio of 50:50. The pulse stream combiner may combine the pulses output at the first output of the switch with the pulses output at the first output of the second splitter. The combiner may output the combined pulse stream to the first receiver. There may be a second pulse stream combiner. The pulse stream combiner may combine the pulses output at the second output of the switch with the pulses output at the second output of the second splitter. The combiner may output the combined pulse stream to the second receiver. There may be one or more further pulse stream combiners. The one or more further pulse stream combiners may combine the pulses output at a corresponding one of the one or more further outputs of the switch with the pulses output at a corresponding one of the one or more further outputs of the second splitter. The combiner may output the combined pulse stream to a corresponding one of the one or more further receivers.

BRIEF DESCRIPTION OF DRAWINGS

An embodiment of the disclosure will now be described, for illustration only, and with reference to the accompanying drawings, in which.

DETAILED DESCRIPTION

Figure 1:
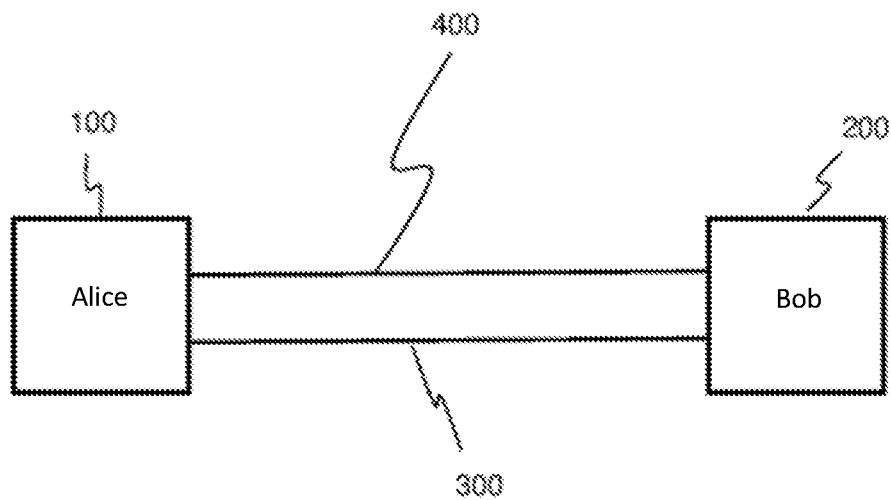
FIG. 1 is a schematic view of a basic QKD architecture comprising a single Alice and a single Bob, according to embodiments of the present disclosure.

The present disclosure concerns improvements in Quantum Key Distribution (QKD). QKD is a method of encryption involving distributing an encryption key from a first quantum node (known as Alice) to a second quantum node (known as Bob). FIG. 1 shows a schematic view of a simplified QKD arrangement in which Alice is shown at 100 and Bob at 200. Although multiple QKD protocols are in use, the present explanation, by way of example, relates to the commonly-used BB84 protocol. In particular, this explanation concerns a type of BB84 in which the modulation is applied to the pulses using polarization. According to that protocol, Alice 100 randomly generates a bit (either 0 or 1) and also randomly chooses one of two polarization bases: rectilinear and diagonal. Alice 100 then sends a photon that has been encoded with the chosen bit and the chosen polarization basis to Bob 200 via a quantum channel 300, such as an optical fiber. Bob 200 randomly selects one of the two polarization bases and measures the photon using its chosen basis. If Bob 200 uses the same basis as Alice 100 then the bit value measured by Bob 200 will match that applied to the photon by Alice 100. After repeating the process with a large number of photons, Alice 100 and Bob 200 perform a key agreement stage. In particular, Alice 100 informs Bob 200, via a non-quantum communication channel 400 (such as a copper cable), which of the two bases Alice 100 applied to each photon, along with the time of transmission by Alice 100 of each photon. Bob 200 then informs Alice 100 which of the two bases Bob 200 used when measuring each photon along with the time at which Bob 200 received each photon. Alice 100 and Bob 200 then discard their bit values for which Alice 100 and Bob 200 used different bases, and keep the remaining bit values. The remaining bit values constitute a secret key that Alice 100 and Bob 200 both have and which they can use to encrypt messages sent between them over the non-quantum channel 400.

Figure 2:
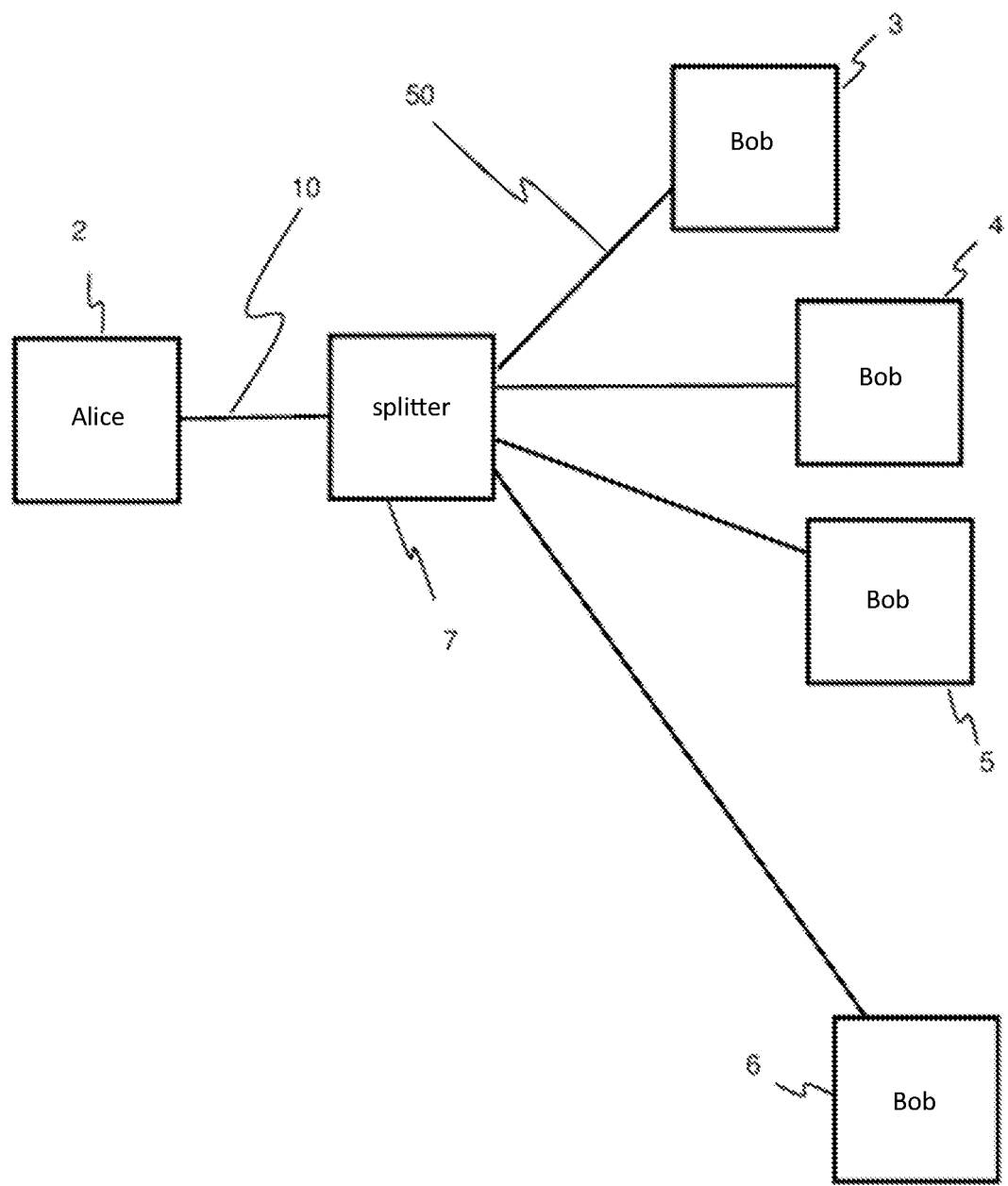
FIG. 2 is a schematic view of a known QKD architecture comprising a single Alice and multiple Bobs, according to embodiments of the present disclosure.

FIG. 2 shows a known QKD architecture. In particular, Alice 2 is connected to four different Bobs 3,4,5,6. An optical splitter 7 is provided in the optical path from Alice 2 to the four Bobs 3,4,5,6. Alice 2 is connected to the splitter 7 by an optical fiber 10. Each of the four Bobs 3,4,5,6 is connected to the splitter 7 by a respective optical fiber 50. Each of the Bobs 3,4,5,6 is also connected to Alice 2 by its own classical (i.e. non-quantum) channel (not shown).

In use, Alice 2 sends a series of photons to the splitter 7, each photon having been encoded with a random bit and a random polarization base as described above. Each photon passes through the splitter 7 and on to one of the Bobs 3,4,5,6. The splitter 7 diverts each photon to one of the Bobs 3,4,5,6 at random. Therefore, on average, 25% are directed towards each of the four Bobs. Each Bob measures the photons using a randomly-chosen polarization basis, and, once it has received enough photons to enable a secret shared key to be established with Alice 2, it does so using the key agreement stage described above. The key agreement stage involves Alice 2 and each one of the Bobs 3,4,5,6 exchanging their respective lists of polarization bases and takes place over the classical channel. Alice 2 and each one of the Bobs use the lists to establish a shared secret key which can be used to encrypt communications between them.

As can be seen in FIG. 2, Bob 6 is located further from the splitter 7 than the other Bobs 3,4,5. As the photons sent to Bob 6 travel further than the photons sent to the other Bobs 3,4,5, the photons transmitted to Bob 6 suffer a greater attenuation. The key exchange rate between Alice and Bob 6 may therefore be lower than the key exchange rate between Alice and the other Bobs 3,4,5. This is undesirable as it slows down the establishment of a secure communication link between Bob 6 and Alice 2. Furthermore, if the photon receipt rate at bob 6 falls below a threshold rate, it is necessary to re-initiate the connection, which is time consuming.

A further disadvantage of the arrangement of FIG. 2 is where one of the Bobs, say Bob 4, needs to establish more keys with Alice over a given time period than do the other Bobs. As the splitter splits the photons approximately equally, it may take a long time to establish all the keys at Bob 4, while photons are sent unnecessarily to other Bobs after they have finished establishing their keys.

Figure 3:
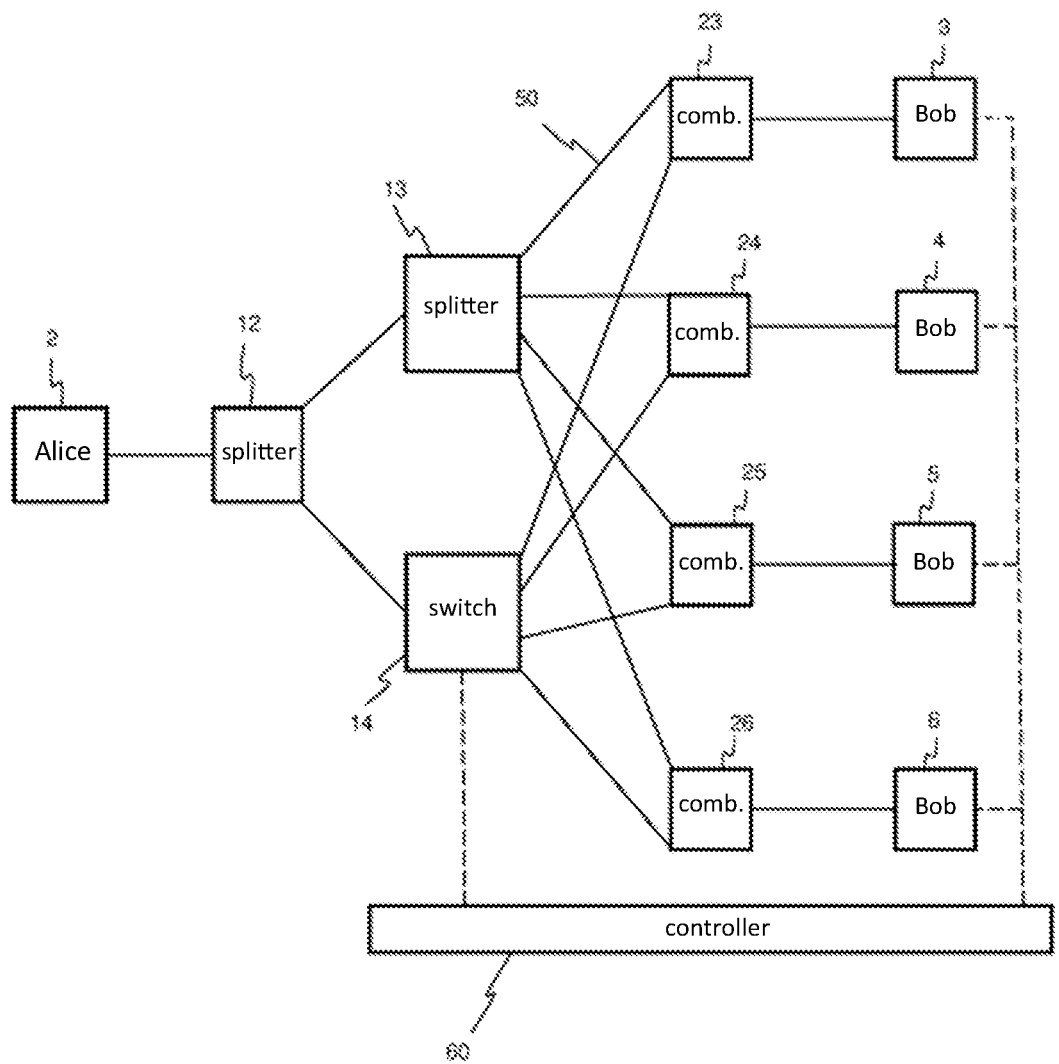
FIG. 3 is a schematic view of an embodiment of the disclosure.

FIG. 3 shows an example arrangement in accordance with the present disclosure. In this example arrangement Alice 2 is optically connected to a splitter 12. The splitter 12 splits the photon stream it receives from Alice 2 with a 10/90 split ratio, such that 10% of the incoming photons are directed towards splitter 13 and the remaining 90% of the incoming photons are directed towards an optical switch 14.

The splitter 13 is optically connected to four optical combiners 23-26 by respective optical fibers. The splitter 13 is configured to split the incoming photon stream it receives from the splitter 12 equally into four streams and output each of the four streams towards a respective combiner 23-26. As the splitter 13 receives 1/10 of the photons from splitter 12 and splitter 13 provides each combiner 23-26 with 1/4 of the photons received from splitter 12, splitter 13 outputs to each combiner 23-26, 1/10×1/4=1/40 of the photon stream received by splitter 12 from Alice 2.

The switch 14 is also optically connected to the four optical combiners 23-26 by respective optical fibers. At any one time, the switch 14 may connect the transmitter to only one of the combiners 23-26. The switching position of switch 14 can be adjusted to switch to a different one of the combiners 23-26. As the switch 14 receives 9/10 of the photons from splitter 12 and switch 14 provides each combiner 23-26 with all of the photons received from splitter 12, switch 14 outputs to the combiner 23-26 it is connected to, 9/10 of the photon stream received by splitter 12 from Alice 2.

Each of the combiners 23-26 combines, using a 50/50 combining ratio, the photon streams it receives. If the position of the switch 14 is such that, say, switch 14 is connected to combiner 23, combiner 23 combines the input streams it receives from splitter 13 and switch 14 and outputs the combined stream towards Bob 3. Half of the power of each photon stream arriving at each combiner 23-26 is lost in the combining process. Therefore the combined photon stream output by combiner 23 comprises:

(i) From splitter 13, 1/80 of the power of the photon stream received by splitter 12; and (ii) From switch 14, 9/20 of the power of the photon stream received by splitter 12.

This makes a total of 0.4625 of the power of the stream received by splitter 12. This power is output by combiner 23 to Bob 3. Each of Bobs 4, 5 and 6 are similarly connected to the outputs of combiners 24, 25 and 26 respectively. As the switch 14 is switched to combiner 23, which means that combiners 24, 25 and 26 may receive zero power from switch 14. Like combiner 23, each of combiners 24-26 receive, from splitter 13, 1/40 of the power of the stream received by splitter 12. Therefore each of combiners 24-26 output to their respective Bobs 4, 5 and 6, 1/80 (i.e. 0.0125) of the power of the stream received by splitter 12.

For analogous reasons, when switch 14 is switched to connect to each of the other combiners 24-26, its respective Bob 4-6 also receives 0.4625 of the power of the stream received by splitter 12 and the remaining combiners each receive 0.0125 of the power of the stream received by splitter 12.

This arrangement provides a continuous photon stream to each Bob 3-6. This means that the sessions between Alice 2 and each of the Bobs 3-6 will remain continuously active, avoiding the need for time consuming re-initiation procedures. Furthermore, if one of the Bobs is located remotely from Alice 2 or otherwise requires a larger photon stream than the other Bobs (e.g. because it needs to generate more keys), the switch can be adjusted to connect to that particular Bob while the extra demand persists.

The position of the switch 14 is controlled electronically by controller 60. Controller 60 is connected to each Bob 3-6 and also to switch 14. Each of the Bobs 3-6 sends the controller 60 an indication of whether the photon power it is currently receiving is adequate. If one of the Bobs sends controller 60 an indication that the power is inadequate, the controller 60 electronically adjusts switch 14 so as to connect it to the combiner associated with that one of the Bobs. The controller 60 continuously monitors the adequacy of the photon power supply to each of the Bobs 3-6 and makes corresponding adjustments to the position of the switch 14.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A system for performing Quantum Key Distribution, the system comprising:
   a transmitter adapted to transmit a plurality of optical pulses that includes secret key information;
   a first quantum receiver;
   a second quantum receiver;
   an optical switch having a first input in optical communication with the transmitter, the optical switch being switchable between a first switching position in which the first input is optically connected to the first quantum receiver without an intervening quantum receiver, and a second switching position in which the first input is optically connected to the second quantum receiver without an intervening quantum receiver; and
   a guide for guiding a portion of the plurality of optical pulses to the first quantum receiver via an optical path that bypasses the optical switch,
   wherein the optical communication from the transmitter is adapted to be a continuous photon stream to each the first quantum receiver and the second quantum receiver.

2. The system of claim 1, wherein the system further comprises one or more further quantum receivers.

3. The system of claim 2, wherein the optical switch has one or more outputs each being optically connected to a corresponding one of the one or more further quantum receivers without an intervening quantum receiver.

4. The system of claim 1, wherein the system further comprises a controller adapted to control the optical switch.

5. The system of claim 4, wherein the controller is adapted to control a switching position of the optical switch.

6. The system of claim 5, wherein the controller is adapted to send a control signal to the optical switch to control the switching position of the optical switch.

7. The system of claim 1, wherein the guide comprises a first optical splitter.

8. The system of claim 7, wherein, in use, the first optical splitter receives the transmitted plurality of optical pulses through a second input and splits the plurality of optical pulses such that a portion of the plurality of optical pulses is guided onto a different path than a remainder of the plurality of optical pulses.

9. The system of claim 8, wherein the portion of the plurality of optical pulses that are guided onto the different path constitutes less than 25% of the plurality of optical pulses.

10. The system of claim 9, wherein the portion of the plurality of optical pulses that are guided onto the different path constitutes 10% of the plurality of optical pulses.

11. The system of claim 1, wherein the guide guides one or more of the plurality of optical pulses to the second quantum receiver.

12. The system of claim 7, wherein the guide comprises a second optical splitter having a third input which is optically connected to a first output of the first optical splitter.

13. The system of claim 12, wherein a first pulse stream output by the optical switch is combined with a second pulse stream output by the second optical splitter before arriving at a respective quantum receiver.

14. A method of performing Quantum Key Distribution between a transmitter and a first quantum receiver and a second quantum receiver, the method comprising:
   transmitting, at the transmitter, a plurality of optical pulses that includes secret key information;
   guiding the plurality of optical pulses to an input of an optical switch, the optical switch being switchable between a first switching position in which the input is optically connected to the first quantum receiver without an intervening quantum receiver, and a second switching position in which the input is optically connected to the second quantum receiver without an intervening quantum receiver; and
   guiding a portion of the plurality of pulses from the transmitter to the first quantum receiver via an optical communication path that bypasses the optical switch,
   wherein optical communication from the transmitter is adapted to be a continuous photon stream to each the first quantum receiver and the second quantum receiver.

15. The method of claim 14, wherein guiding the portion of the plurality of pulses from the transmitter to the first quantum receiver via an optical communication path that bypasses the optical switch comprises splitting the plurality of optical pulses.

16. The system of claim 13, wherein the first pulse stream output by the optical switch is combined with the second pulse stream output by a pulse stream combiner.

17. The system of claim 16, wherein the pulse stream combiner is distinct from the first quantum receiver and the second quantum receiver.

* * * * *